United States Patent [19]

Beck

[11] 4,357,655
[45] Nov. 2, 1982

[54] THREE-PHASE INVERTER

[75] Inventor: William H. Beck, Rancho Palos Verdes, Calif.

[73] Assignee: The Garrett Corporation, Los Angeles, Calif.

[21] Appl. No.: 262,861

[22] Filed: May 12, 1981

[51] Int. Cl.³ .............................................. H02M 1/12
[52] U.S. Cl. ...................................... 363/42; 318/811
[58] Field of Search ..................... 318/811; 363/41, 42

[56] References Cited

U.S. PATENT DOCUMENTS

| | | | |
|---|---|---|---|
| 3,538,420 | 11/1970 | Klein | 363/42 |
| 3,739,253 | 6/1973 | Humphrey et al. | 363/42 |
| 4,153,930 | 5/1979 | Marceau et al. | 363/42 |
| 4,291,368 | 9/1981 | Yarema et al. | 363/41 |

Primary Examiner—William M. Shoop
Attorney, Agent, or Firm—James W. McFarland; Leslie S. Miller; John H. Lynn

[57] ABSTRACT

A pulse width modulated three-phase inverter has notches in the output waveforms to control the harmonic content thereof.

13 Claims, 7 Drawing Figures

THREE-PHASE INVERTER

BACKGROUND OF THE INVENTION

1. Field of the Invention

This invention relates generally to apparatus and methods for converting direct current to alternating current and particularly to an inverter which incorporates pulse width modulation to reduce the magnitude of undesirable harmonics.

2. Description of the Prior Art

Many direct current to alternating current inverter systems use pulse width modulation to control both single phase and polyphase outputs. There is increasing use of solid state inverters for control elements, particularly in applications to variable frequency A.C. motor drive systems. One of the desirable characteristics of an inverter drive system for such an application is the ability to maintain constant motor torque over a relatively wide motor speed range, which requires that the A.C. motor energizing potential display a substantially constant ratio of voltage to frequency (or volts/Hertz) as the frequency varies. Most solid state controls maintain a fixed ratio of voltage to frequency by either controlling the D.C. input to a fixed pulse width inverter or by controlling the inverter output pulse width as a function of frequency and using a substantially constant voltage source of D.C. energy.

Because the first method mentioned usually involves two stages of power control, recent variable speed motor drive systems use the pulse width modulation (PWM) method to achieve the necessary control characteristics. One of the disadvantages associated with operating a variable frequency multiphase inverter using PWM techniques is an increase in the magnitudes of undesirable harmonics in the output waveforms. The presence of undesirable harmonics in the output waveform is particularly important in the lower range of the operating frequency spectrum wherein such harmonics usually increase in amplitude compared with the amplitude of the fundamental frequency component created under such conditions.

The prior art contains many examples of pulse width modulated power sources capable of producing various waveforms. The "six-step" waveform is the basic waveform of many prior art inverters. The conventional six-step waveform results from switching each of the three legs of a three-phase inverter twice in each wavelength of the output fundamental frequency. A sequence of switching actions occurs with a phase difference of 60 degrees separating the switching action in each leg from the switching in the other two legs. The potential differences between pairs of legs of the inverter produce the three-phase output waveforms. While it is generally accepted that the six-step wave is satisfactory for energizing an A.C. motor, modulation of the six-step waveform for variable frequency A.C. motor drive systems produces outputs which are relatively high in harmonic content. It is possible to use PWM to control the amplitude of the fundamental frequency component of a six-step waveform; however, as the amplitude of the fundamental frequency component decreases, the amplitudes of the fifth and seventh harmonics, which are the most undesirable, increase to such portions of the total waveform that motor losses severely penalize the effectiveness of the system.

In the prior art, the effects of increasing amplitudes of the fifth and seventh harmonics are minimized by using a multiple inverter system and combining the outputs of the inverters such that the undesirable harmonics are substantially eliminated. Multiple inverter systems usually introduce considerable complexity and cost into the inverter equipment.

A second method for minimizing undesirable harmonics in the output of an inverter system while modulating the fundamental frequency component is to introduce additional switching actions into the inverter to produce notches in the output waveforms. The placement and control of auxiliary switching points has been the subject of considerable investigation which has produced numerous switching systems. In general, the goal of each system is to minimize the number of inverter switching actions consistent with the capability to control the amplitude of the fundamental frequency component and harmonic content over a wide operating frequency range. However, motor losses due to fifth and seventh harmonics has heretofore remained a serious difficulty in variable frequency A.C. motor drive systems.

The art exhibits a need for a low-cost, efficient inverter system which produces a variable frequency output having a constant volts/Hertz in the fundamental frequency and having acceptable fifth and seventh harmonic frequency components.

SUMMARY OF THE INVENTION

The present invention overcomes the difficulties associated with prior art three phase inverter systems by using eight extra switching points in each cycle in addition to the two necessary for generating the basic six step waveform. These eight additional switching points are placed within each wave length such that notches in the waveform which result therefrom are created symmetrically about the 75°, 105°, 255°, and 285° points. Controlling the width of the notches in all three legs of a three-phase inverter controls the amplitude of the fundamental frequency component of the output waveform. The particular angles which are the centers of the notches create a unique relationship between the fundamental frequency component and the fifth and the seventh harmonics. As the notches become symmetrically wider, the amplitude of the fundamental frequency component linearly decreases. However, this decrease in the amplitude of the fundamental is accompanied by a decrease in the amplitude of the fifth and seventh harmonic frequency components, which both decrease at a rate more rapid than that of the fundamental frequency component as the notches become wider. Therefore, as the notch width increases, the fifth and seventh harmonic frequency components represent decreasing portions of the total waveform.

The waveforms, which are the output of the invention, when applied to an A.C. induction motor drive system or to any appropriate load, permit variable frequency, constant volts/Hertz operation without increasing the percentages of fifth and seventh harmonics above that present in the basic six-step waveform. In addition to providing acceptable fifth and seventh harmonics as the fundamental frequency varies, the present invention permits implementation by simple, low-cost digital logic components.

DESCRIPTION OF THE PREFERRED EMBODIMENT

Figure 1:
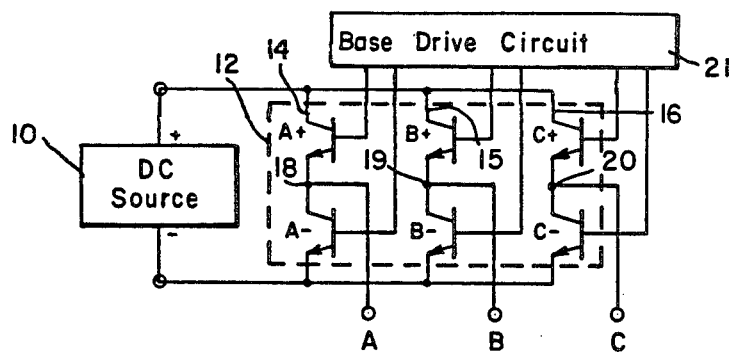
FIG. 1 is a simplified schematic diagram of an inverter system.

Referring to FIG. 1, an inverter for providing a three phase A.C. output includes a D.C. source 10 which provides a D.C. input into a switch network 12, which comprises a first group of switches A+, B+ and C+ connected to the positive terminal of DC source 10 and a second group of switches A−, B− and C− connected to the negative terminal of DC source 10. Switch network 12 is a basic version of a three phase inverter bridge with switches A+ and A− connected together to form a leg 14 thereof and with switches B+ and B−, C+ and C− being similarly connected to form a leg 15 and a leg 16, respectively. Switch network 12 includes an A.C. output terminal A connected to a junction 18 between switches A+ and A−; an A.C. output terminal B connected to a junction 19 between switches B+ and B−; and an AC output terminal C connected to a junction 20 between switches C+ and C−. Switch network 12 thus provides a three phase output having a phase AB taken between output terminals A and B, a phase BC taken between output terminals B and C, and a phase CA taken between output terminals C and A. The switches A+, A−, B+, B−, C+ and C− may comprise transistors or other suitable switching devices. In the illustrated embodiment the switches A+, A−, B+, C+ and C− are transistors and a base drive circuit 21 has outputs connected to the bases of the transistors for controlling the switching actions thereof.

Operation of the circuit of FIG. 1 will be described with reference to FIG. 2 which illustrates the waveforms which result from conventional operation of switch network 12 to produce six step waveforms. The condition of each of pair switches A+, A−; B+, B−; and C+, C− changes every 180° of the output fundamental frequency. The switching of each pair is separated by 60° from each of the other pairs. One switch of each pair is closed while the counterpart thereof is open to produce predetermined phase relationships between the A.C. output signals at output terminals A, B, and C. The waveforms 2A, 2B and 2C represent line-to-neutral voltages for the three output terminals A, B, and C, respectively, wherein the neutral is the midpoint of the D.C. input potential.

Waveforms 2D, 2E and 2F represent the line-to-line voltages between the output phases AB, BC, and CA, respectively. The waveforms representing line-to-line voltages are each the difference between a pair of line-to-neutral waveforms. For example, the waveform 2D representing the line voltage of output phase AB is the difference between voltage waveforms 2A and 2B. The line-to-line waveforms have twice the amplitude of the line-to-neutral waveforms and alternate from positive to negative in the form of pulses which extend for 120° in a normal three phase system. The line-to-line waveform AB has a 60° zero amplitude portion which results either when switches A+ and B+ are connected to the positive terminal of the DC source or when switches A− and B− are connected to the negative terminal of the DC source.

Line-to-line voltage waveforms BC and CA are similar to line-to-line voltage waveform AB with the only differences being phase shifts of 120° and 240°, respectively.

Figure 2:
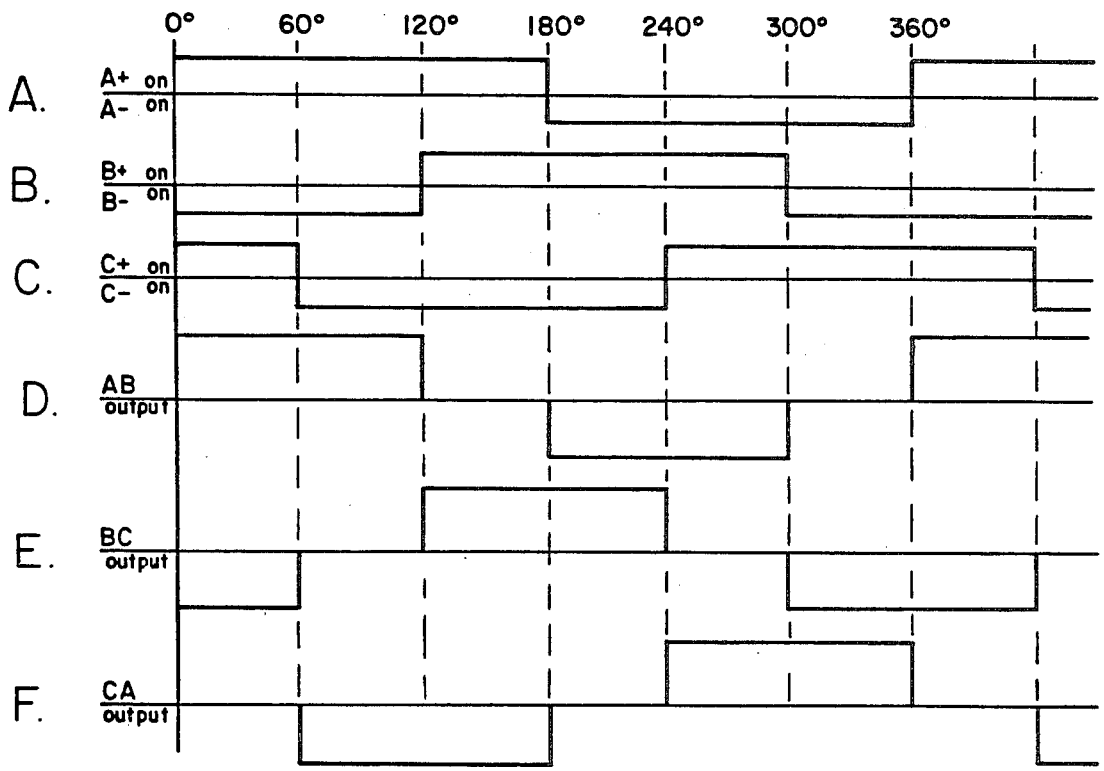
FIG. 2 is a series of waveform diagrams labeled 2A-2F corresponding to the conventional operation of the inverter of FIG. 1.
Figure 3:
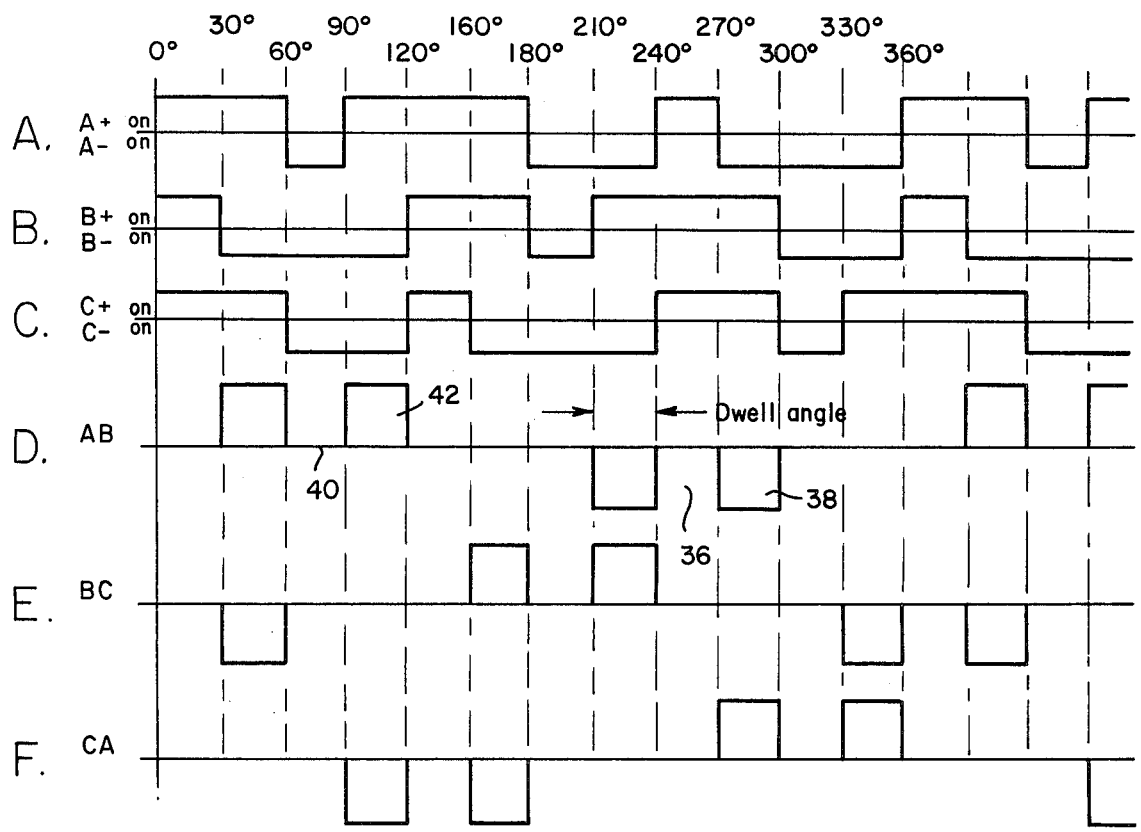
FIG. 3 is a series of waveform diagrams labeled 3A-3F for pulse width modulated operation of the inverter of FIG. 1.

Previous attempts to use pulse width modulation of the basic six step waveform illustrated in FIG. 2 to provide a variable frequency signal having a constant volts/Hertz have resulted in the increased percentage of undesirable harmonics in the output waveform. FIG. 3 illustrates typical waveforms which result from pulse width modulation of the six step waveform with waveforms 3A-3F corresponding to waveforms 2A-2F. In inverter applications, pulse width modulation involves "notching" a rectangular pulse to produce a modulated output waveform. The term "notching" as used herein with respect to a waveform means to change the state of the waveform for a predetermined period of time during each cycle thereof so as to cause a notch or gap to appear in the waveform. For example, the switching of leg 14 so that switch A+ is on and switch A− is off between 240° and 270° and switching leg 14 so that switch A− is on and switch A+ is off between 60° and 90°, as shown in waveform 3A produces a notch 36 in pulse 38 of waveform 3D and a notch 40 in pulse 42 thereof. The duration of a notch in the output line-to-line waveforms is hereinafter referred to as the notch angle.

Figure 4:
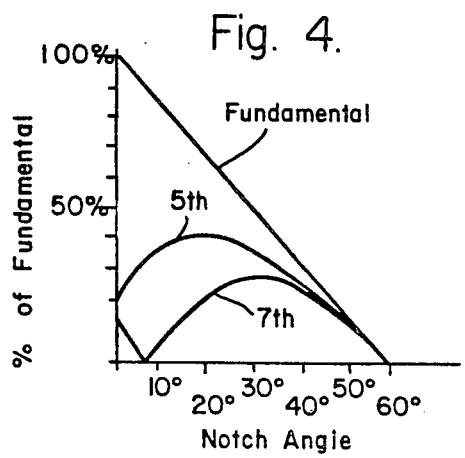
FIG. 4 is a graph illustrating harmonics related to the inverter system of FIG. 1 operated to produce the waveform of FIG. 3.

It is known in the art that pulse width modulation by introducing notches into a rectangular waveform may substantially eliminate lower order harmonics; but, as shown in FIG. 4, higher order harmonics, such as the fifth and seventh, may become appreciable fractions of the amplitude of the fundamental frequency component of the waveform. FIG. 4 represents the percentages of the fundamental amplitude of the fifth and seventh harmonics as functions of the notch angle. The illustrated amplitudes of the fifth and seventh harmonics are such proportions of the fundamental amplitude that driving a motor with such a waveform would result in severe motor losses due to the relatively high percentage of harmonic content.

Figure 5:
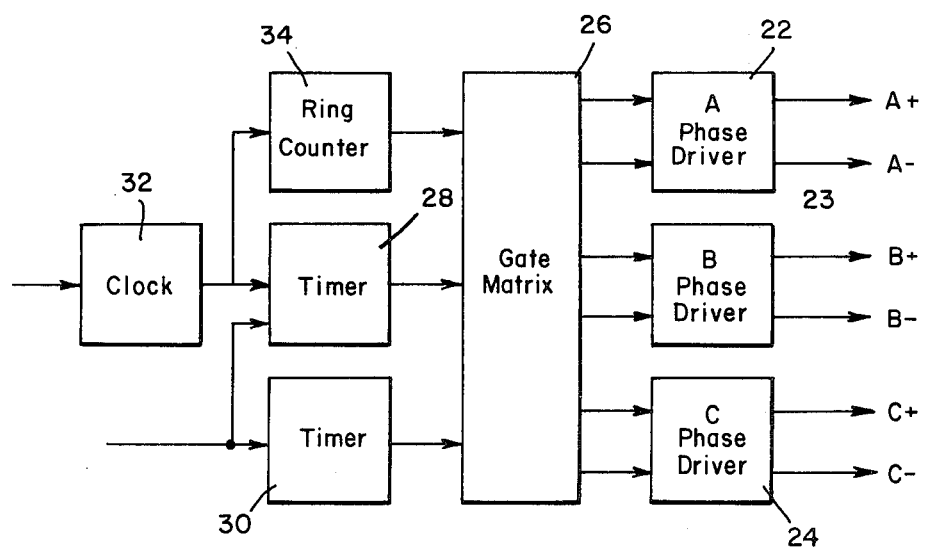
FIG. 5 is a block diagram of a gating circuit for use in the inverter system of FIG. 1 according to the present invention.

Referring to FIG. 5, the present invention utilizes a gating circuit for the inverter system which includes an A phase driver 22 having output terminals A+ and A−, a B phase driver 23 having output terminals B+ and B−, and a C phase driver 24 having output terminals C+ and C−. Phase drivers 22-24 comprise suitable switching devices, which are connected to the gates of the thyristors A+, A−, B+, B−, C+, C− to control the switching action thereof. The circuitry which controls the switching action of the phase drivers 22-24 includes a gate matrix 26, a first interval timer 28, a second interval timer 30, a clock 32 and a ring counter 34.

Clock 32, which includes means for varying the frequency of the clock pulses, provides clock output signals to interval timer 28 and to ring counter 34. Interval timer 28 outputs a signal to interval timer 30 and to gate matrix 26; and both timers 28 and 30 and ring counter 34 provide control signals to gate matrix 26, which provides switch control signals to each of the phase drivers 22-24. Interval timers 28 and 30 each include therein means for adjusting the duration of the output signals thereof.

Figure 6:
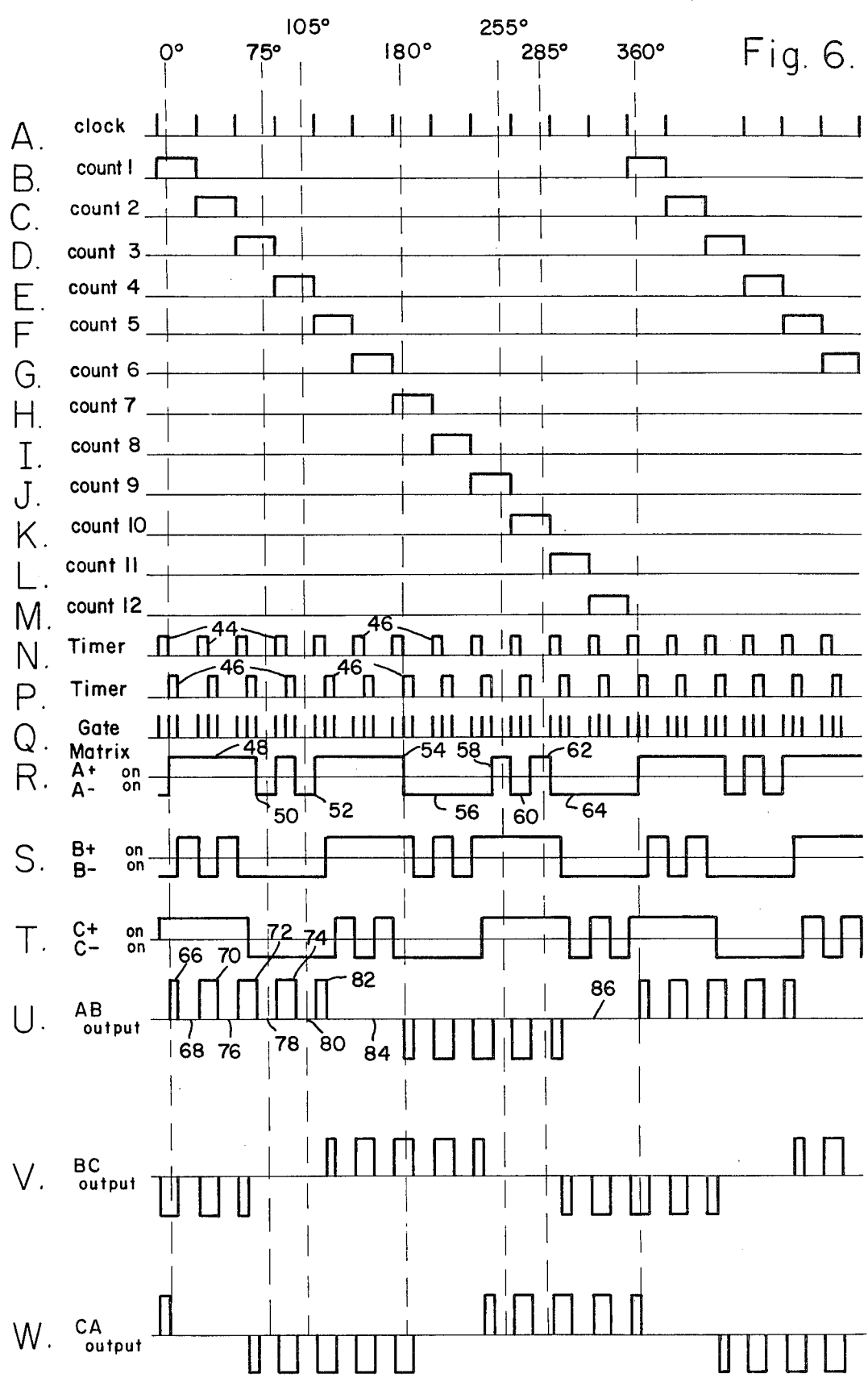
FIG. 6 is a series of waveforms for the inverter system of FIG. 1 having the gating circuitry of FIG. 5.

Operation of the circuit of FIG. 5 can be understood with reference to FIG. 6 which illustrates the output signals of clock 32 (6A), ring counter 34 (6B-6M), interval timer 28 (6N), interval timer 30 (6P), gate matrix 26 (6Q), phase drivers 22-24 (6R-6T), and the line-to-line output voltages AB (6V), BC (6V), and CA (6W). The circuitry of FIG. 5 performs eight switching operations in each of the phase drivers 22-24 in addition to the two switching operations necessary in each for generating the basic six step waveform of FIG. 3 to produce a variable frequency output waveform having a constant volts/Hertz with acceptable fifth and seventh harmonic content.

In the example shown in FIG. 6, the frequency of the clock signal 6A, which is input to interval timer 28 and ring counter 34, is twelve times the fundamental frequency of the output line-to-line waveform. In response to the clock signals, ring counter 34 produces a succession of 12 pulses 6B-6M, each having a duration equal to the time interval between successive clock pulses. In response to the clock pulses, interval timer 28 produces a sequence of pulses 6N indicative of a first selected time interval. The falling edge 44 of each pulse output from interval timer 28 triggers interval timer 30 to produce a train of pulses 6P indicative of a second selected time interval such that the rising edge 46 of each pulse output of interval timer 30 is in substantial alignment with the falling edge of each interval timer 28 pulse. In the illustrated example the output pulses of interval timer 30 and interval timer 28 have durations of 7.5°. The rising and falling edges of the pulses output from ring counter 34 and interval timers 28 and 30 control gate matrix 26 to produce a succession of gate matrix pulses 6Q for controlling the switching action of the phase drivers 22-24. The output of gate matrix 26 combines sets of 3 very short pulses 7.5° apart with 15° between successive sets of pulses, with information from the ring counter pulses, 6B-6M, to activate the appropriate driver. Although the preferred embodiment described herein includes interval timer 28 and 30 for controlling notch width, those skilled in the relevant arts should recognize that any method for producing waveforms 6N and 6P, which control the switching actions of the gate matrix 26, could be used in implementing the present invention.

The 0° reference of FIG. 6 corresponds to the 0° reference of FIG. 2 for the basic six step waveform. Gate matrix 26 produces an output pulse at 0° to switch the output waveform 6R of A phase driver 22 from negative to positive to initiate a positive rectangular pulse 48 at output terminal A of FIG. 1. Gate matrix 26 produces an output pulse at 67.5° to switch A phase driver 22 from positive to negative; and a gate matrix pulse at 82.5° switches the output of A phase driver 22 from negative to positive to form a notch 50 in the output of A phase driver 22. Notch 50 is centered about the 75° point in the output waveform of A phase driver 22 and has a notch angle of 15°. A gate matrix pulse at 97.5° switches the output of A phase driver 22 from positive to negative; and a gate matrix pulse at 112.5° switches the output of A phase driver 22 from negative to positive to form a second notch 52 in the output waveform of A phase driver 22. Notch 52 also has a notch angle of 15° and is centered about the 105° point in the waveform 6R. The switching action in A phase driver 22 at the 112.5° point initiates a positive pulse 54, which terminates at the 180° point to begin a negative rectangular pulse 56 as in the basic six step waveform. A gate matrix pulse at 247.5° switches the output of A phase driver 22 from negative to positive, and a gate matrix pulse at 262.5° switches the output of A phase driver 22 from positive to negative to form a notch 58 centered about the 255° point in the waveform 6R with a notch angle of 15°. After forming the notch 58, A phase driver 22 produces a negative rectangular pulse 60 which terminates upon the occurrence of a gate matrix pulse at 277.5°, at which time the output waveform 6R of A phase driver 22 switches from negative to positive. The output of A phase driver 22 switches from positive to negative at 292.5° to form a notch 62 centered about the 285° point with a notch angle of 15°. A negative rectangular pulse 64 completes the remainder of the wavelength of the waveform 6R.

The remaining gate matrix pulses 6Q cause B phase driver 23 and C phase driver 24 to undergo switching operations similar to those of A phase driver 22 to produce a B phase driver output waveform 6S and a C phase driver output waveform 6T. The output waveforms of B phase driver 23 and C phase driver 24 have the same configuration as the output waveform of A phase driver 22 with phase lags of 120° and 240°, respectively, relative to the output waveform of A phase driver 22.

Waveform 6U illustrates the line-to-line voltage AB, which is the potential difference between the output terminals A and B of FIG. 1. Graphically, output waveform 6U is the difference between waveform 6R and waveform 6S. Waveform 6U begins at 0° with a positive pulse 66 having a duration of 7.5° followed by a null signal 68 having a duration of 15°. Waveform 6U continues with three positive rectangular pulses 70, 72 and 74, each having a 15° duration with a 15° null signal 76 between pulses 70 and 72 and a 15° null signal 78 between pulses 72 and 74. A 15° null signal 80 separates a 7.5° rectangular pulse 82 from pulse 74. From the 120° point to the 180° point waveform 6U is a null signal 84. Beginning at 180°, the waveform continues with a succession of pulses which are the negatives of the pulses 66, 70, 72, 74 and 82 with 15° null signals separating adjacent pulses. From 300° to 360° the output waveform 6U is a null signal 86.

Waveform 6V represents the potential difference between B phase driver 23 and C phase driver 24; and waveform 6W represents the potential difference between C phase driver 24 and A phase driver 22. The waveforms 6V and 6W have the same configuration as waveform 6U but have phase lags of 120° and 240°, respectively relative to waveform 6U.

Figure 7:
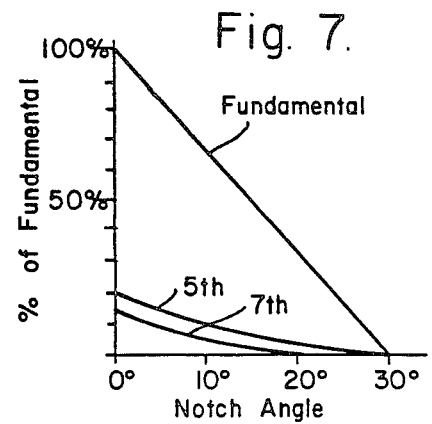
FIG. 7 is a graph illustrating harmonics related to the inverter system of this invention.

FIG. 7 illustrates the relationship of the fundamental frequency component and the fifth and seventh harmonics as functions of the notch angles located in each phase as described hereinabove. Varying the notch angles modulates the amplitude of the fundamental frequency component in the line-to-line output voltage waveforms because increasing the notch angle decreases the magnitude of the fundamental frequency component. The angles which are the centers of the notches, create unique relationships between the fifth and seventh harmonics and the fundamental frequency component. While the amplitude of the fundamental frequency component linearly decreases as the notches become symmetrically wider about the indicated center points in the waveform, the amplitudes of the fifth and seventh harmonic frequency components decrease at a rate more rapid than that of the fundamental component. Therefore, circuitry which controls the locations and notch angles provides means for controlling the amplitude of the fundamental frequency component of the output waveform and the percentages of fifth and seventh harmonics therein. Adjustment of the duration of the pulses output from interval timers 28 and 30 sets a specific volts/Hertz value over the entire operating frequency. Timers 28 and 30 may be adjusted at any time during operation of the system to provide voltage compensation, current limiting, or programmed changes of the volts/Hertz value.

Although the present invention has been illustrated and described with reference to a specific preferred embodiment, it should be understood that the present invention is not limited thereto and that the appended claims define the scope of the invention.

What is claimed is:

1. A polyphase inverter, comprising:
    a direct current source of electrical energy;
    a plurality of switching means connected to said direct current source;
    gating means for selectively actuating said switching means for selected periods of time to produce a six-step output waveform having a predetermined fundamental frequency in each of a plurality of phases;
    means, operatively associated with said gating means, for varying said selected periods of time to control the percentage of selected harmonics in said six-step output waveforms;
    means for maintaining the amplitude of the fundamental frequency of said six-step output waveforms at a substantially constant volts/Hertz value;
    modulating means for varying said selected periods of time to produce notches in said six-step output waveforms, said notches being centered at predetermined locations in said six-step waveforms, said notches having predetermined width, and
    said polyphase inverter providing six-step output waveforms to a first phase, a second phase, and a third phase, said second phase having a phase angle of 120° relative to said first phase, said second phase having a phase angle of 240° relative to said first phase and wherein said notches in said first phase are symmetrically located about the 75°, 105°, 255°, and 285° points in the six-step output waveform thereof with the notches in the output waveforms of said second and third phases being out of phase with the notches in said first phase by 120° and 240°, respectively.

2. A polyphase inverter according to claim 1 further including means for selectively varying the fundamental frequency of said six-step output waveforms.

3. A polyphase inverter according to claim 1 or 2 wherein said means for varying said selected periods of time includes:
    clock means for generating clock signals having a clock frequency which is a multiple of the fundamental frequency;
    interval timer means connected between said clock means and said gating means for providing a first signal indicative of a first selected time interval and a second signal indicative of a second selected time interval, said interval timer means including said means for maintaining the amplitude of the fundamental frequency of said six-step output waveforms.

4. A polyphase inverter according to claim 3 wherein said means for maintaining the amplitude of the fundamental frequency of said six-step output waveform includes means for controlling the duration of signals output by said interval timer means.

5. A polyphase inverter according to claim 4 wherein said selected harmonics include the fifth and seventh harmonics of said fundamental frequency.

6. A polyphase inverter for providing six-step output waveforms to a first phase, a second phase, and a third phase, said second phase having a phase angle of 120° relative to first phase, said third phase having a phase angle of 240° relative to said first phase, comprising:
    a direct current source of electrical energy;
    a plurality of switch means connected to said direct current source;
    gating means for selectively actuating said switching means for selected periods of time to produce six-step output waveforms having a predetermined fundamental frequency in each of said phases;
    clock means for generating clock signals having a clock frequency which is a multiple of the fundamental frequency; and
    interval timer means connected between said clock means and said gating means for generating timing signals for controlling said selective periods of time to produce a plurality of notches in said six-step output waveforms to modulate said six-step output waveforms to provide a constant volts/Hertz value and to control the percentages of selected harmonics therein, said first phase having notches symmetrically located about the 75°, 105°, 255°, and 285° points therein with the notches in the output waveforms of said second and third phases being out of phase with the notches in said first phase by 120° and 240°, respectively.

7. A method for converting direct current into polyphase alternating current, comprising the steps of:
    connecting a plurality of switching means to a direct current source of electrical energy;
    selectively actuating said switching means for selected periods of time with a gating means output to produce output waveforms having a fundamental frequency in each of a plurality of phases;
    varying said selected periods of time to control the percentage of selected harmonics in said output waveform in each phase; and
    maintaining the amplitude of the fundamental frequency in the output waveform at a substantially constant volts/Hertz value in each phase by varying the width of pulses generated upon actuation of said switching means.

8. A method according to claim 7 wherein said output waveforms are six-step waveforms.

9. A method according to claim 8 further including the step of selectively varying the fundamental frequency of said output waveform in each phase.

10. A method according to claim 7 or 9 further including the steps of:
    generating clock signals having a clock frequency which is a multiple of the fundamental frequency;
    counting said clock signals;
    actuating a first interval timing means with the rising edges of said clock signals to generate a first timing signal indicative of a first selected time interval;

actuating a second interval timing means with the falling edges of said signal to generate a second timing signal indicative of a second selected time interval; and controlling the output of said gating means with the outputs of said ring counter and said first and second interval timing means for selectively actuating said switching means.

11. A method according to claim 10 wherein said maintaining step includes controlling the duration of signals output by said first and second interval timer means.

12. A method according to claim 11 wherein said selected harmonics are the fifth and seventh harmonics in said output waveform.

13. A method for converting direct current into three-phase alternating current, comprising the steps of:

generating six-step waveforms having a predetermined fundamental frequency in a first phase, a second phase and a third phase, the waveform of said second phase having a phase angle of 120° relative to the waveform of said first phase, the waveform of said third phase having a phase angle of 240° relative to the waveform of said first phase;

modulating the six-step waveforms to produce notches therein, the notches in the first phase being symmetrically located about the 75°, 105°, 255° and 285° in the output waveform thereof, the notches in the second and third phases having phase angles of 120° and 240°, respectively, with the notches in the first phase; and controlling the notch angles to vary the fundamental frequency while maintaining a substantially constant ratio of voltage to fundamental frequency in the output of each phase.

* * * * *